April 20, 1926.

H. V. LEAHY

FURNACE

Filed August 13, 1924    6 Sheets-Sheet 1

Inventor

HERBERT V. LEAHY.

By Lyon & Lyon

Attorneys

H. V. LEAHY

FURNACE

Filed August 13, 1924   6 Sheets-Sheet 5

Inventor
HERBERT V. LEAHY.

By Lyon & Lyon
Attorneys

April 20, 1926.

H. V. LEAHY

FURNACE

Filed August 13, 1924    6 Sheets-Sheet 6

Inventor

HERBERT V. LEAHY.

By Lyon & Lyon

Attorneys.

Patented Apr. 20, 1926.

1,581,353

UNITED STATES PATENT OFFICE.

HERBERT V. LEAHY, OF LOS ANGELES, CALIFORNIA.

FURNACE.

Application filed August 13, 1924. Serial No. 731,755.

*To all whom it may concern:*

Be it known that I, HERBERT V. LEAHY, a citizen of the United States, residing at Los Angeles, in the county of Los Angeles and State of California, have invented a new and useful Furnace, of which the following is a specification.

This invention relates to furnaces, and more especially to that type of furnace that uses a fluid or semi-fluid fuel. For example, the fuel may be either gas, oil, or a colloidal form, or may be a mixture of any two or more of these.

The type of furnace disclosed herein is one that can be constructed in very large units, such as those employed, for example, in pulp mills. In such plants great quantities of steam are required and an object of the invention is to increase the capacity of the boilers.

A very important object of the invention is to provide a construction that will insure against rapid deterioration of the furnace walls.

When fluid or semi-fluid fuels are employed in a furnace the source of heat is only flaming gases and the intensely hot gases, possibly on account of the character of the fuel employed, produce rapid deterioration of the ordinary solid furnace walls.

An important object of the invention is to rapidly conduct heat away from the inner faces of the furnace walls so as to avoid their becoming heated to a temperature that entails rapid deterioration and breaking down of said walls.

Another important object of the invention is to make provision for efficient distribution of air to the fire in the furnace so that sufficient oxygen will be supplied to the different parts of the zone of combustion to effect as nearly perfect combustion of the fuel as is possible, thus economizing in the consumption of the fuel and preventing the production of objectionable smoke.

Another object is to construct a furnace in which the burners are arranged in groups and the zones occupied by the different groups are separately supplied with air, thus making possible a unit construction that will permit of the furnace being readily manufactured in different sizes by employing the desired number of units.

One of the principal objects of the invention is to make provision for rapid changing over from the use of one kind of fluid or semi-fluid fuel or mixture of such fuels to another kind of fluid or semi-fluid or mixture of the same, and to make it possible to quickly change the proportion of the various fuels when employed in a mixture. For example, if it be assumed that oil is being burnt exclusively in the furnace and the oil supply runs low, it would be desirable to employ in conjunction with the oil a gas fuel. Or the conditions might be reversed so that it would be necessary to supplement the burning of gaseous fuel with the burning of oil.

Another important object is to make it possible to quickly change from mechanical atomization of a liquid or semi-liquid fuel to steam atomization thereof, or vice versa, and to quickly change from high pressure gas to low pressure gas, or vice versa.

From the foregoing it will be seen that the relative availability and costs of fluid and semi-fluid fuels can be fully taken advantage of and that fuel can be used from many different sources at different times or from two or more different sources simultaneously.

A further object is to improve the construction of the floor through which the fuel enters the zone of combustion.

Other objects and advantages will appear in the subjoined detailed description.

There is provided a combustion chamber 21 having a front wall 22, a rear wall 23, end walls 24, 25 respectively, a roof 26, and a floor 27. In the floor 27 of the combustion chamber is a burner well or pit 28. The pit preferably expands upwardly and its front and rear walls 29, 30, and end walls 31, 32 slant upwardly and outwardly.

The floor of the pit 28 is preferably upwardly convex or arcuate and comprises a suitable number of burner tiles 33, preferably polygonal in plan and having an even number of sides. In this instance they are hexagonal and are laid so that their long diameters are alined in one direction, thus making vertical air ducts 34 between adjacent tiles. Because of the arcuate shape of the floor with the burner tiles set therein and the upward expansion of the well, the flames are caused to spread fan-wise. The tiles 33 are provided with circular burner openings 35 into the lower ends of which project low pressure gas burner tubes, some of said tubes being straight as indicated at 36, others being L-shaped as indicated at 37, and still others being L-shaped in part and being indicated at 38. Each tube 36 connects with a gas distributing box 39 and the tubes 37, 38 connect also with some of said boxes.

The boxes 39 in this instance are upwardly convex and are permanently mounted in the space beneath the floor tiles 33 and said space is divided into a number of separate air chambers 40, the separation being effected by a partition plate 41 extending from end to end of the furnace and by other partition plates 42, some of which extend from the plate 41 to the front wall of the furnace and some from the plate 41 to the rear wall. For reasons to appear hereinafter, it is preferable that the front partitions 42 be in staggered relation with the rear partitions 42, thus making the centers of the front chambers 40 in staggered relation with those of the rear chambers 40.

Communicating with the chambers 40 are air passages 43, the front passages 43 being formed between the wall 29 and a partition plate 44, and the rear passage 43 being formed between the wall 30 and a partition plate 45. The floors 46 of the chambers 40 separate said chambers from air passages 47 which passages are separated front and rear from the passages 43 by the partition plates 44, 45, respectively. It is understood that the partition plates 42 not only separate adjacent chambers 40 endwise of the furnace, but also separate endwise the passages 43 from one another and the passages 47 from one another.

The front air passages 43 communicate at their upper ends with draft openings 48 in the front wall controlled by doors 49, and the forward ends of the passages 47 communicate with draft openings 50 in the front wall controlled by doors 51. The rear passages 43 communicate through ports 52 in the partition plates 45 with the rear ends of the passages 47. Thus, it will be clear that air for the front chamber 40 is supplied through the draft openings 48 and front passages 43 and that air is supplied to the rear chambers 40 through the draft openings 50 passages 47 ports 52 and rear passages 43. The air in the passages 43 passes downwardly along the outer faces of the walls 29, 30, tending to cool said walls to prevent rapid deterioration thereof. Also, the air, because of the heated walls 29, 30, will be preheated before passing into the burner chambers 40. Not all of the air entering the passages 43 passes to the chambers 40, but some passes upwardly, thence inwardly through ports 53 formed in the upper portion of the walls 29, 30, 31 and 32 of the burner pit, thus supplying air to the upper portion of said pit near the level at which the gases enter the combustion chamber.

It will be seen from the foregoing that the capacity of the furnace can be increased by providing additional burner chambers 40. Thus the furnace is built on the unit plan, a unit comprising a burner chamber 40 with the desired number of burners positioned therein. The burner boxes 39 are connected by pipes 54 to a low pressure gas supply pipe 55. The individual pipes 54 are provided with cocks 56. It will be readily understood that the construction described above provides for operation of the furnace on relatively low pressure, the relatively great number of burner tubes evenly distributing the heat over the entire floor area of the burner pit. Because of the burner being arranged in an arc the fuel will be discharged fanwise into the well and, accordingly, uniformly distributed from front to rear of the well.

I have made provision for burning, either in place of the low pressure gas or in conjunction therewith, oil or other liquid or semi-liquid fuel or high pressure gas and the burners for accomplishing this are positioned at the vertical axes of the burner chambers, the pit floor being formed in part by larger burner tiles 57, the smaller burner tiles 33 being grouped around said larger tiles. Though burners for using the different fuels will be of somewhat different types, those shown at 58, at the axes of the chambers 40 in the drawings, may be considered as typical of such burners. The burner tubes 58 can be readily placed in position because of the staggered relation of the front and rear burner chambers 40. The burner tubes 58 are slidably mounted in guides 59 in the interior of the air mixers 60 which are at the axes of the burner chambers 40, and the burner tubes 58 are removably supported by supports 61 that can be raised and lowered at will.

The construction I at present prefer for effecting raising and lowering of the burner tubes is as follows: Each support 61 is carried by a vertical rack 62 sliding in a guide 63 that is a part of the air mixer 60. The rack 62 is operated by a pinion 64 on a shaft 65 which is journaled in a bearing 66 that projects from one side of the air mixer 60. The shaft 65 is provided in one end with a square hole 67 loosely engaged by the square end 68 of an operating rod 69 which extends through an opening 691 in the front wall of the furnace and is manipulated by a suitable crank 692 or other well-known rotating device. The loose connections 67, 68 enable the operating rods 69 to be assembled somewhat out of axial alinement with the pinion shafts 65.

Figure 1:
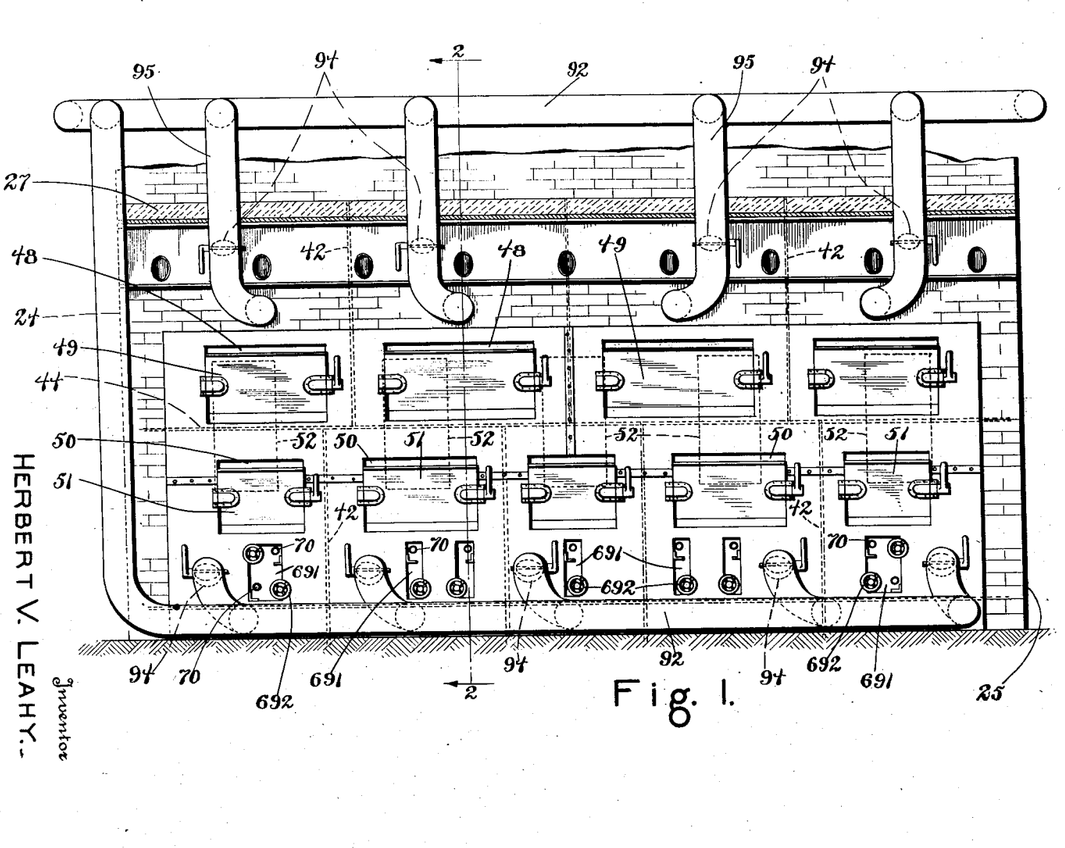
Figure 1 is a front elevation of a furnace constructed in accordance with the provisions of this invention, the upper portions being broken away to contract the view.
Figure 2:
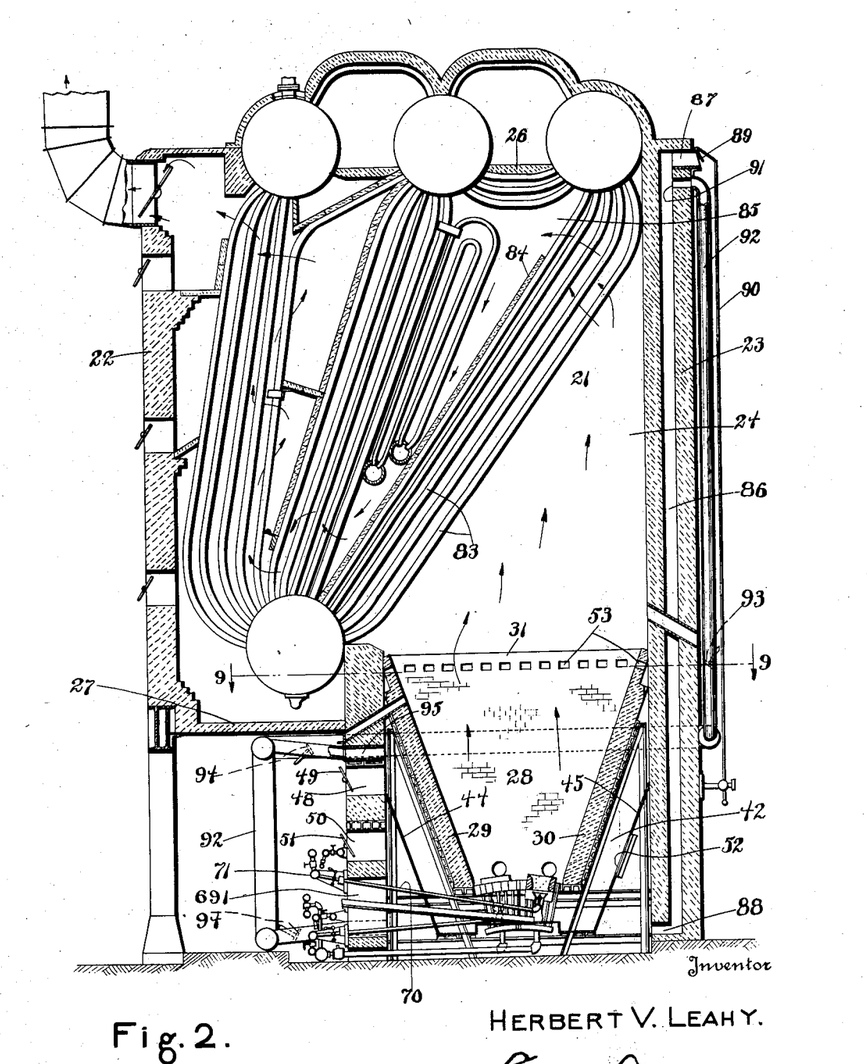
Fig. 2 is an enlarged sectional elevation on the line indicated by 2—2, Fig. 1, the upper portion of the furnace being intact excepting that a portion of the stack is broken away.
Figures 3, 4:
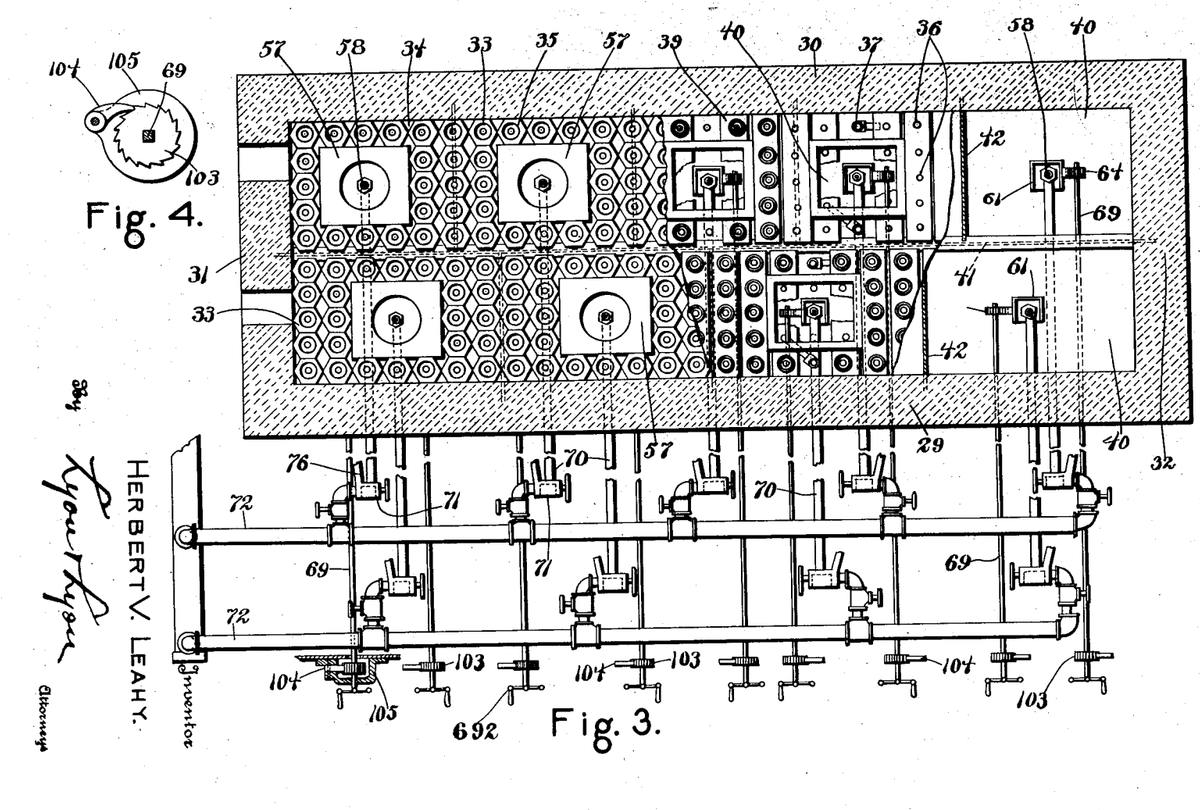
Fig. 3 is an enlarged plan section taken through the burner pit or well at a point just above the floor thereof, some of the burner tiles and burners being omitted to show the construction therebeneath. Some of the fuel pipes are broken and they are shown schematically so as to better illustrate the supplying of the fuel to the furnace burners.
Fig. 4 is an elevation of one of the pawl and ratchet devices for holding the mechanical or steam atomizing burners or high pressure gas burners in position, the shaft on which the ratchet wheel is mounted being shown in section.
Figure 5:
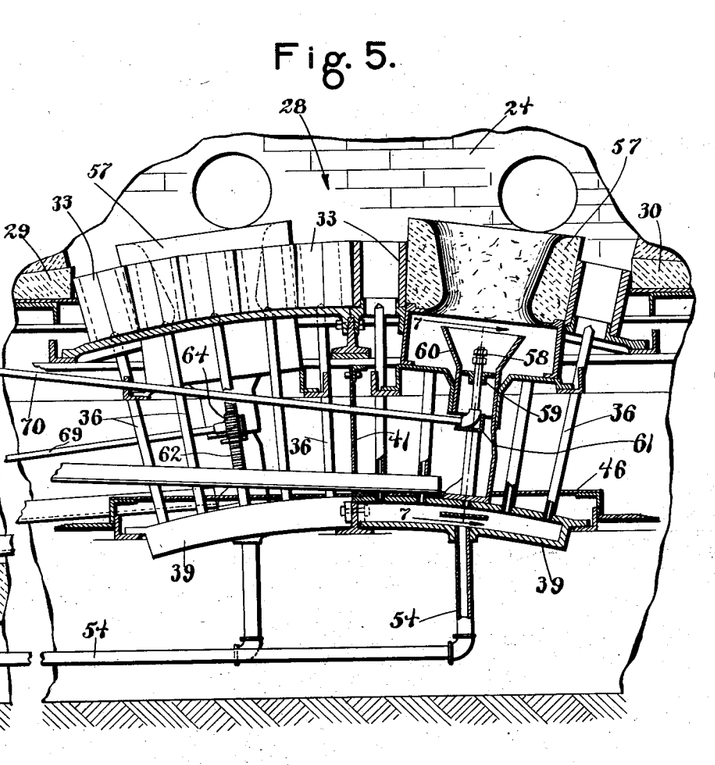
Fig. 5 is an enlarged broken sectional elevation through the lower portion of the furnace, showing the construction on a larger scale than in Fig. 2.
Figures 6, 7:
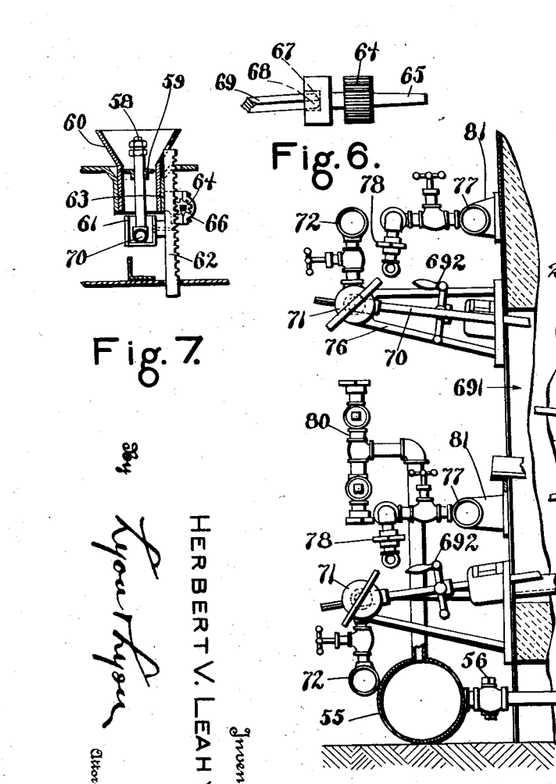
Fig. 6 is an enlarged detail of one of the pinions and the connection between its shaft and the operating member for effecting raising and lowering of one of the burners.
Fig. 7 is a sectional elevation on the line indicated by 7—7, Fig. 5.
Figure 8:
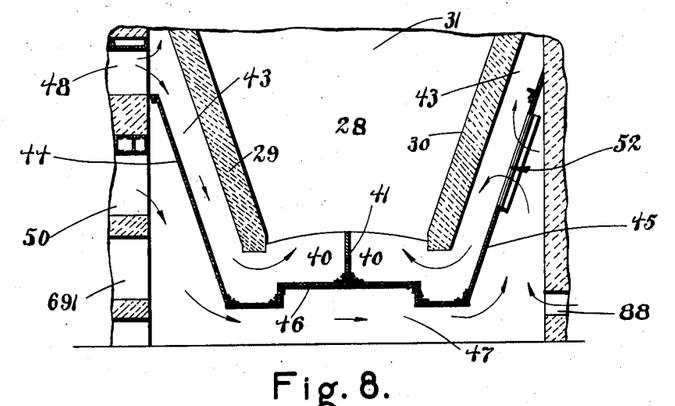
Fig. 8 is a sectional elevation of the lower portion of the burner pit on a larger scale than in Fig. 2, the burners, burner tiles and burner raising and lowering mechanism being omitted to clearly show the air passages leading to the burner pit.
Figure 9:
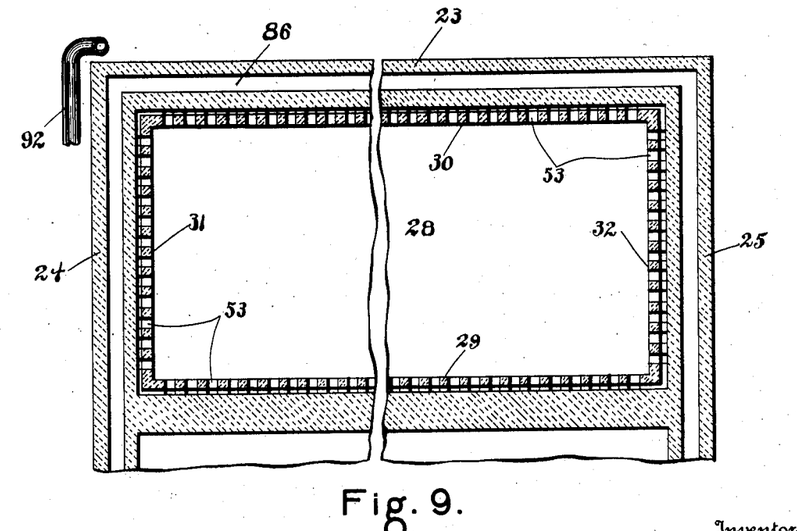
Fig. 9 is a broken plan section on the line indicated by 9—9, Fig. 2, the parts below the plane of section not being shown.

The burner tubes 58 are supplied with fuel through pipes 70 which are removable with said tubes and are detachably connected at their outer ends by yoke connectors 71 to a supply pipe 72. The pipes 70 leading to the rear burner tubes alternate with those leading to the front burner tubes, this being possible because of the staggered arrangement of the air chambers 40, and thus removal and replacement of all of the burner supply pipes is easily accomplished from the front of the furnace. The construction and operation of the yoke connectors is well understood in the art relating thereto and, accordingly, they need not be described in detail herein. It may be assumed, for example, that the burners 58, in Figs. 2, 3 and 5, are of the mechanical atomizing type, and that the supply pipe 72 is supplying a liquid or semi-liquid fuel under pressure. When it is desired to employ burners atomizing the fuel by steam pressure, or burners using high pressure gas, pipes 70 will be disconnected from the pipe 72 and the burners 58 will be lowered and withdrawn and the other burners, not shown, but well understood in this art, substituted therefor.

Figures 10, 11, 12, 13, 14, 15:
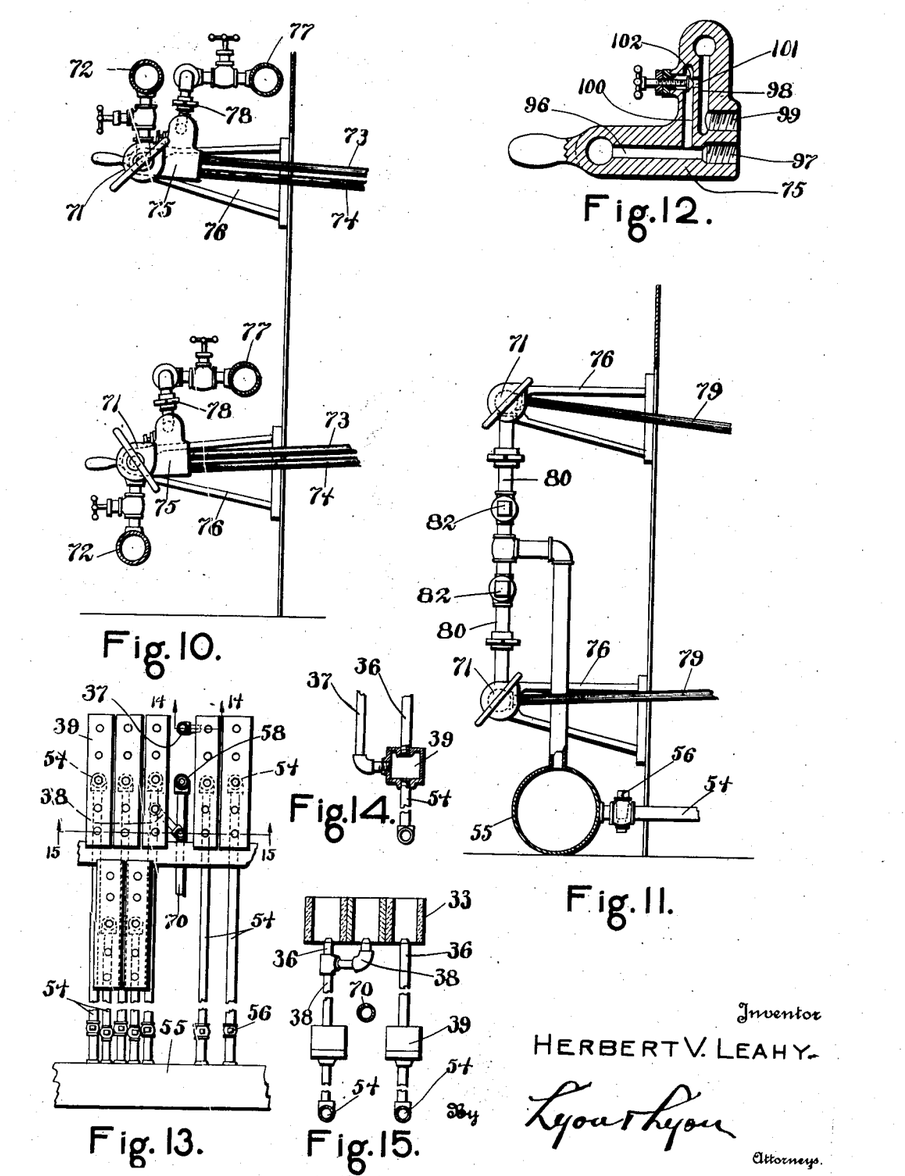
Fig. 10 is an enlarged detail, partly in section, of two of the fuel controls arranged for the use of steam atomized oil.
Fig. 11 is an enlarged detail, partly in section, of two of the fuel controls arranged for the use of high pressure gas.
Fig. 12 is an enlarged sectional elevation through one of the by-pass heads.
Fig. 13 is a fragmental plan section of several of the low pressure gas burner boxes and one of the burners, the feed pipes to said boxes also being shown.
Fig. 14 is an enlarged broken elevation, partly in section, on the line indicated by 14—14, Fig. 13.
Fig. 15 is an enlarged broken elevation, partly in section, from the line indicated by 15—15, Fig. 13, three of the burner tiles also being shown in section.

In Fig. 10 I have illustrated steam and oil pipes 73, 74 for supplying steam and oil to burners of the type that atomize the oil by the use of steam and show said pipes connected with by-pass heads 75 which receive oil from the supply pipes 72 and steam from supply pipes 77. The by-pass heads 75 are detachably connected with the pipes 72 by the yoke connectors 71 and with the pipes 77 by unions 78.

In Fig. 11 are shown gas supply pipes 79 adapted to connect with high pressure gas burners of any suitable construction, not illustrated and described herein as their construction is well understood in this art. The pipes 79 receive high pressure gas from pipes 80 connected with the gas supply pipe 55 and provided with cocks 82. The pipes 79 are detachably connected by the yoke connectors 71 to the branch pipes 80.

It is to be noted that the fuel supply pipes 72, 80 and steam supply pipes 77 are all permanently arranged adjacent to the front wall of the furnace and that the means for detachably connecting each group of fuel supply pipes to the different burners includes the one yoke connection element 71 capable of making the connection for a plurality of the burners. The yoke connection elements 71 are integral with brackets 76 which are mounted on the front furnace wall. The steam supply pipes 77 are supported by brackets 81 mounted on the front furnace wall.

From the foregoing it will be clear that a change over from one kind of fluid or semi-fluid fuel to another may be quickly effected and also that two or more different fuels may be employed at the same time. For example, either low pressure gas, oil, high pressure gas, or a colloidal fuel may be employed in combination with the low pressure gas by a few simple adjustments. It will also be clear that adjustments can be quickly effected to provide for either mechanical atomization of the oil or colloidal fuel or steam atomization thereof.

When the burners are in operation, the fuel is discharged upwardly into the combustion chamber 21 toward the upper end of a bank of water tubes 83 which extend aslant rearwardly and upwardly above the well 28 and just beneath a baffle wall 84 that also extends aslant upwardly and rearwardly from a point adjacent to the upper end of the front wall 29 of the well over the well toward the front wall and that has in its upper portion an opening 85. The burner orifices point toward the mouth of the well and the water tubes extend across the opening 85. The construction last mentioned is similar to that disclosed in my former Patent Number 1,390,798, dated September 13, 1921, but the low pressure gas burners are positioned so that the upper ends thereof define points in an arc extending from front to rear of the well 28. By this construction the flames are spread to uniformly cover the entire cross-sectional area of the well and combustion chamber and, consequently, the flames will be caused to pass from end to end of the bank of water tubes 83.

The rear wall 23 and end walls 24, 25 are provided with an air passage 86 which serves to conduct away heat from said walls so that they will not become soft and disintegrate. This is especially useful for the lower portions of said walls because of the superimposed weight of the upper portions of said walls. When the lower portions of the furnace walls become highly heated and there is no facility for conducting away the heat from said portions, they become sufficiently soft for the weight of the portion of the wall imposed thereon to compress the lower portions and cause said lower portions to flow, thus quickly destroying the walls. I have made provision for air to flow from the top to the bottom of the passage 86 and for this purpose use a draft inlet or inlets 87 at the upper end of said passage and an outlet or outlets 88 at the lower end of said passage. The inlet openings 87 are provided for natural draft and are controlled by doors 89 operated by suitable mechanism indicated in general at 90. I have also provided at the upper ends of the passage 86 other draft inlets 91 in case it is desired to have forced draft, said inlets 91 being connected to a manifold 92 which receives air under pressure from any suitable source. The branches of the manifold 92 are provided with regulating valves 94.

Preferably the outlets 88 of the passage 86 comunicate with the rear portion of the passage 47 so that air inducted into the passage 86 will flow through the rear burner chambers 40 and into the well or pit 28. One advantage of this is that the furnace draft will serve to draw the air rapidly through the passage 86 so as to intensify the cooling effect of said air upon the furnace walls. The air flowing through the passage 86 will be preheated and, accordingly, wastage of heat through the ventilating passage 86, cannot occur. When forced draft is employed through the passage 86, the draft in the combustion chamber is materially aided.

Besides being able to use forced draft in the rear chambers 40, it may also be used for the front chamber 40 and for this reason the front furnace wall 22 may be provided above the draft inlets 48 with other draft inlets 95 which are connected with the manifold 92.

The by-pass heads hereinbefore mentioned are each constructed with a fuel duct 96 terminating at one end in a threaded opening 97 to receive the oil pipe 74, and a steam duct 98 terminating at one end in a threaded opening 99 to receive the steam pipe 73. Also there is a steam duct 100 communicating through a port 101 with the duct 98 and also communicating with the duct 96. Flow of steam into the duct 100 is controlled by a valve 102 which is adapted to close and open the port 101. This construction of the by-pass heads enables the operator to clean out the pipes 74 and oil burners, not shown, attached to said pipes by blowing steam therethrough.

The operation of the furnace will be apparent from the foregoing description and is as follows:

Assuming that during a certain interval of time, a large supply of low pressure gas is available at a cost that will make it economical to employ said gas in place of other fluid fuels that may be employed in the furnace, the low pressure gas burners alone, under such conditions, will be put into operation. It may be further assumed that at a later period of time it becomes advisable, either because of economy in operation or because of the low pressure gas supply decreasing, to employ in conjunction with the low pressure gas either high pressure gas, oil, or a colloidal fuel. If oil is to be used the pipes 70 will be connected with the supply pipe 72 in the manner shown in Fig. 5, and mechanical atomization of the oil is effected, or if desired, the burners 58 may be lowered by suitable operation of the shafts 59 and other burners for other fuels substituted therefor. If high pressure gas is available at lower cost than the oil, the burners 58 will be removed and high pressure gas burners substituted therefor. The same thing applies to the use of colloidal fuel. In any event, it will be readily comprehended that two different fuels can be used in combination or either one of two different fuels may be quickly substituted for the other. This is a very valuable provision in cases of emergency arising from any cause whatsoever and makes the furnace very economical to operate.

If it be desired to employ natural draft, the doors 49, 51 and 89 will be opened and the valves 93, 94 will be closed and air will pass along the walls 23, 24, 25, 29, 30, 31 and 32 to cool said walls, said air being preheated thereby before entering the burner pit around the burners through the openings 34 and through the ports 53.

If forced draft is to be employed the doors 49, 41, 89 will be closed, and the valves 93, 94 will be opened. The course of the air will be the same as just described for the natural draft.

The flames from the burners will be projected into the combustion chamber 21 toward the upper ends of the water tubes 83 and will pass through the opening 85, thence between the balance of the water tubes of the boiler, not necessary to describe in detail as the construction thereof is well understood.

From the foregoing, it will be seen that the air passing to each of the burner units does so independently of the air passing to each of the other units and that the flow of air to each unit can be independently controlled. A further advantage that may be mentioned is that by having the air chambers 40 and passages 47 beneath the burner pit 28 the foundation or base structure of the furnace is well protected against injurious heating and the air passing into the pit is further preheated.

When colloidal fuel is to be used instead of oil it will be supplied through the pipes 72.

The burners 58 are releasably held in elevated position by any suitable means and, in this instance, such means comprises ratchet wheels 103 on the shafts 69 and pawls 104 engaging said ratchet wheels. Each pawl is pivoted, as shown in Fig. 4, to a suitable mounting 105.

I claim:

1. A furnace comprising a combustion chamber provided with a well in the floor thereof, the space beneath the well being divided into a number of separate air chambers, a burner box in each air chamber, an air passage extending beneath the floor of the air chambers, an air passage leading over the first mentioned air passage to one of the air chambers, and another air passage connecting the first mentioned air passage with another of the air chambers.

2. A furnace comprising a combustion chamber provided with a well in the floor thereof, the space beneath the well being divided into a number of separate air chambers, a burner box in each air chamber, an air passage extending beneath the floor of the air chambers, the floor of the well having air ducts opening into the air chambers between adjacent burner boxes, an air passage leading over the first mentioned air passage to one of the air chambers, and another air passage connecting the first mentioned air passage with another of the air chambers.

3. A furnace comprising a combustion chamber provided with a well in the floor thereof, the space beneath the well being divided into a number of separate air chambers arranged in rows, a burner box in each chamber, air passages extending beneath the floor of the air chambers, air passages leading over the first mentioned air passages to the air chambers of one row, and other air passages connecting the first mentioned air passages with the air chambers of the other row.

4. A furnace comprising a combustion chamber provided with a well in the floor thereof, the front and rear walls of the well slanting upwardly and outwardly, the space beneath the well being divided into a number of separate air chambers, a burner box in each chamber, the front wall of the combustion chamber having draft openings, an air passage extending downwardly from one of the draft openings thence beneath the floor of the air chambers thence upwardly, an air passage between the first mentioned air passage and the front wall of the well leading to one of the air chambers, and another air passage between the first mentioned air passage and the rear wall of the well connecting another of the air chambers with the first mentioned air passage.

5. A furnace comprising a combustion chamber provided with a well in the floor thereof, separate burner chambers beneath the well, there being separate air passages leading to the respective burner chambers, a baffle wall extending aslant above the well and having an opening in its upper portion, and a bank of water tubes extending aslant beneath the baffle wall and across the opening.

6. A furnace comprising a combustion chamber provided with a well in the floor thereof, separate burner chambers beneath the well, there being separate air passages leading to the respective burner chambers and one of the air passages extending beneath the burner chambers, a baffle wall extending aslant above the well and having an opening in its upper portion, and a bank of water tubes extending aslant beneath the baffle wall and across the opening.

7. A furnace comprising a combustion chamber provided with a well in the floor thereof, a burner chamber beneath the well, low pressure gas burners permanently mounted in the burner chamber, means to supply said burners with low pressure gas, a burner of a different type removably mounted in the burner chamber, a pipe connected with the last burner and removable therewith, and means detachably connected with said pipe to supply fuel thereto.

8. A furnace comprising a combustion chamber provided with a well in the floor thereof, a burner chamber beneath the well, pipes adjacent to the front wall of the combustion chamber for supplying different kinds of fuel, means for removably mounting burners of different types at different times in the burner chamber, and means for detachably connecting the different fuel supply pipes to the different burners, such means including one element capable of making the connection for a plurality of the burners.

9. A furnace comprising a combustion chamber provided with a well in the floor thereof, there being burner tiles for the floor of the well, means dividing the space beneath the floor of the well into a plurality of burner chambers, means to induct air to the several chambers separately, and burners in the burner chambers.

10. A furnace comprising a combustion chamber provided with a well in the floor thereof, there being burner tiles for the floor of the well and there being air ducts between some of the adjacent tiles, a burner chamber immediately beneath the floor of the well communicating with the air ducts, burners in the burner chamber, and means to induct air to the burner chamber.

11. In a furnace, a furnace floor comprising polygonal burner tiles having an even number of sides lying at less than a right angle to one another and positioned with their long diameters alined in one direction so as to form air ducts between adjacent tiles.

12. In a furnace, a furnace floor comprising a larger burner tile, and smaller burner tiles grouped around the larger tile and constructed and arranged to form air ducts between the smaller tiles.

13. A furnace comprising a combustion chamber provided with a well in the floor thereof, the space beneath the well being divided into a number of separate air chambers arranged in rows, the air chambers of one row being in staggered relation with those of the other row, a burner box in each chamber, air passages extending beneath the floor of the air chambers, air passages leading over the first mentioned air passages to the air chambers of one row, other air passages connecting the first mentioned air passages with the air chambers of the other row, and pipes leading to the burner boxes, the pipes leading to the burner boxes in one row of the air chambers alternating with those leading to the burner boxes in the other row of air chambers.

14. A furnace comprising a combustion chamber provided with an upwardly expanding well in the floor thereof, the well having an upwardly convex floor formed at least in part by burner tiles, burners beneath the floor of the well arranged in an arc, a baffle wall extending aslant above the well and having an opening in its upper portion, and a bank of water tubes extending aslant beneath the baffle wall and across the opening.

15. A furnace comprising a combustion chamber provided in its floor with a well having a floor with a burner tile therein, a burner in the space beneath the burner tile, and means operable to raise and lower the burner.

16. A furnace comprising a combustion chamber provided in its floor with a well having a floor with a burner tile therein, a burner support mounted to move up and down beneath the burner tile, a burner removably mounted in the support, and means to raise and lower the support.

17. A furnace comprising a combustion chamber provided in its floor with a well having a floor with a burner tile therein, a burner support movably mounted beneath the burner tile, a burner removably mounted in the support, and means to move the support into different positions.

18. A furnace comprising a combustion chamber provided in its floor with a well having a floor with a burner tile therein, a burner support mounted to move up and down beneath the burner tile, a burner shiftable horizontally on the support, and means to raise and lower the support.

19. A furnace comprising a combustion chamber having a well in the floor thereof, the well having a floor with vertical air ducts therein and there being a space beneath the floor of the well, and a burner in said space, the ducts being arranged at intervals around the burner.

20. A furnace comprising a combustion chamber having a well in the floor thereof, the well having upwardly and outwardly slanting walls and having a floor with vertical air ducts therein and there being a space beneath the floor of the well, and a burner in said space, the ducts being arranged at intervals around the burner.

21. A furnace comprising a combustion chamber provided with an upwardly expanding well in the floor thereof, the well having an upwardly convex floor formed at least in part by burner tiles, and burners beneath the floor of the well arranged in an arc.

22. A furnace comprising a combustion chamber provided with an upwardly expanding well in the floor thereof, the well having a floor formed at least in part by burner tiles, and burners positioned adjacent to the bottom of the well and projecting into the burner tiles and arranged in an arc to discharge the fuel fanwise into the well.

23. A furnace comprising a combustion chamber having draft openings in its front wall, a well in the floor of the combustion chamber, front and rear air chambers beneath the well, burners in the air chambers, means to conduct air from one of the draft openings downwardly adjacent to the front wall of the well to the front air chamber, and means to separately conduct air from the other draft opening beneath the air chambers and downwardly adjacent to the rear wall of the well to the rear air chamber.

Signed at Los Angeles, California, this 6th day of August 1924.

HERBERT V. LEAHY.